July 2, 1940. A. Y. DODGE 2,206,742
BRAKE
Original Filed March 28, 1938  2 Sheets-Sheet 1

INVENTOR
Adiel Y. Dodge.
BY Amus, Phiess, Olan & Mecklenburger
ATTORNEYS.

July 2, 1940.　　A. Y. DODGE　　2,206,742
BRAKE
Original Filed March 28, 1938　　2 Sheets-Sheet 2

INVENTOR
Adiel Y. Dodge.
BY
ATTORNEYS

Patented July 2, 1940

2,206,742

UNITED STATES PATENT OFFICE 2,206,742

BRAKE

Adiel Y. Dodge, Rockford, Ill.

Original application March 28, 1938, Serial No. 198,378. Divided and this application August 22, 1938, Serial No. 226,089

8 Claims. (Cl. 188—78)

My invention relates to brakes.

This application is a division of my co-pending application Serial No. 198,378, filed March 28, 1938.

One of the objects of my invention is to provide an improved brake construction having a single expansible and contractible cylindrical actuating band for causing movement of the arcuate brake band members toward and from a cylindrical braking surface.

A further object of my invention is to provide such a construction in which a cylindrical supporting surface is provided for the actuating band when in nonbraking position, thus insuring withdrawal of all portions of the arcuate brake band members from engagement with the cylindrical braking surface.

A further object of my invention is to provide such a brake construction in which the brake band members may be used until worn out without necessitating adjustment between the actuating band and the band actuating means as the brake bands members wear.

A further object of my invention is to provide such a brake construction in which the initial "take-up" movement of the actuating band is effected by a relatively high speed hydraulic transmission between the brake pedal and the hydraulic band actuator and in which the final "pressure applying" movement of the actuating band is effected by a relatively low speed hydraulic transmission between the brake pedal and the hydraulic band actuator.

A further object of my invention is to provide such a construction in which, in case the low speed transmission fails in applying the braking pressure, the "high speed" transmission will be effective for this purpose.

I am aware that there have been previous attempts to accomplish some of these objectives. However, it is naturally out of the question to use any brake control apparatus which brings about a sudden change of application of pressure.

Further objects and advantages of the invention will be apparent from the description and claims.

In the drawings, in which several embodiments of my invention are shown,

Fig. 3 is an enlarged axial section showing the brake drum and backing plate;

Fig. 4 is a sectional view substantially on the line 4—4 of Fig. 3;

Fig. 5 is a detail view showing the actuating band; and

Figure 1:
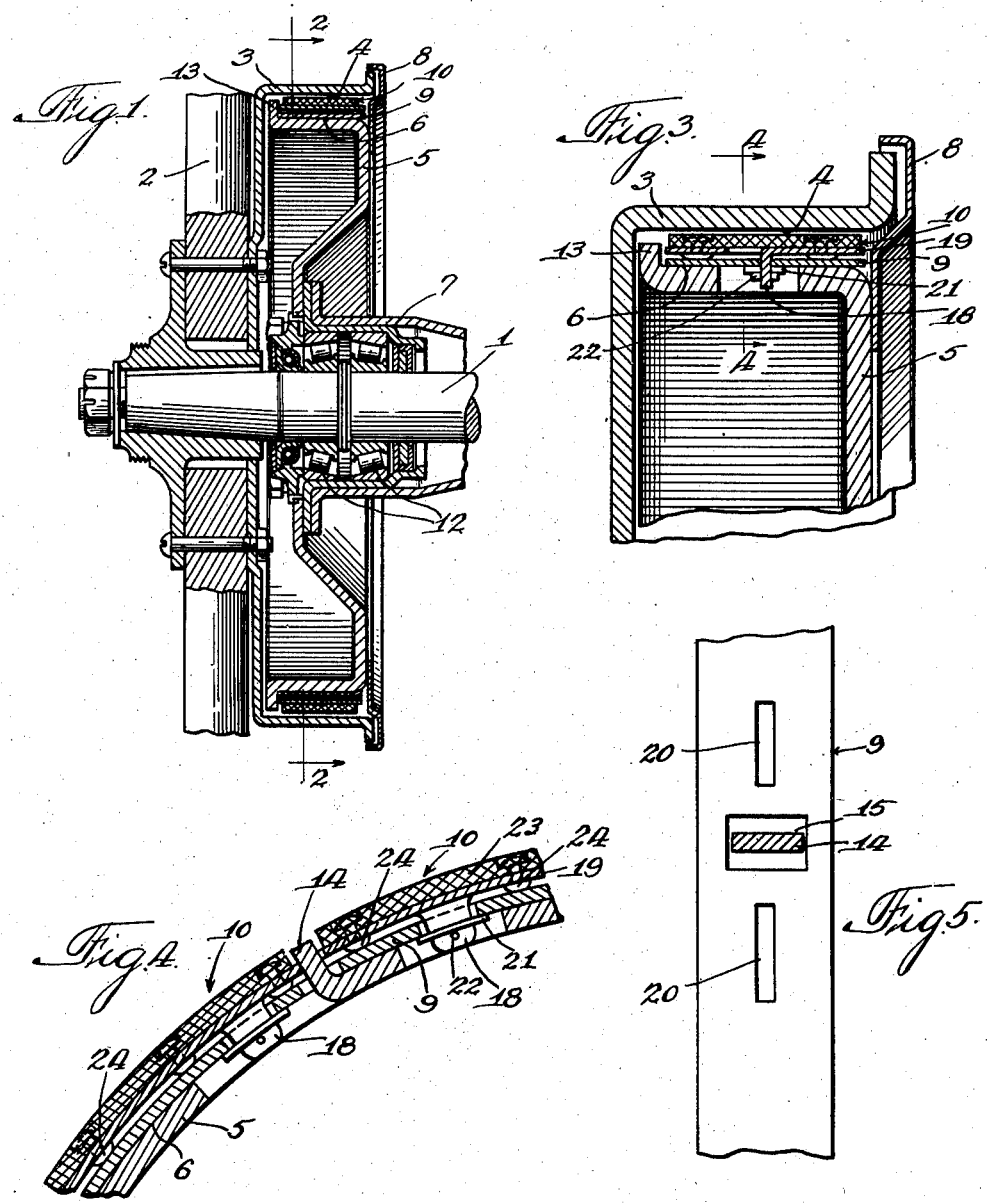
Figure 1 is an axial section showing the brake construction and associated parts.

Referring first to Figs 1 to 5, inclusive, the construction shown comprises an axle 1 which may be the axle of an automobile, a portion of one of the wheels 2 mounted on this axle to rotate therewith, a brake drum 3 having an integral braking surface 4 secured to this wheel 2, a backing plate 5 having a cylindrical band-supporting surface 6 secured to a non-rotatable part of the automobile, such as the housing 7 for the bearings for the axle 1, a guard member 8 secured to this backing plate 5, a flexible metal cylindrical expansible band 9 extending around the major portion of the cylindrical supporting surface 6 and engaging and supported by said surface when in contracted condition, a plurality of flexible segmental arcuate brake band members 10 (three being shown) lying between said expansible band 9 and said cylindrical braking surface 4, means for holding one end of said expansible band against circumferential movement with respect to said cylindrical supporting surface 6, fluid pressure means 11 for forcing the other end of the band 9 circumferentially away from the stationary end of the band, and means for holding the flexible brake band members 10 against circumferential movement with respect to the cylindrical supporting surface 6.

The wheel and axle construction may be of any suitable type, that shown comprising suitable anti-friction bearings 12 by means of which the axle 1 and wheel 2 are rotatably mounted in the nonrotatable housing member 7. The expansible band 9 and the arcuate brake band members 10 are held in place against excessive lateral movement between the flange 13 on the backing plate 5 and the guard plate 8 secured to the backing plate. The means for holding one end of the expansible band against circumferential movement comprises an abutment member 14 struck up from the material of the backing plate and extending through and fitting fairly closely in an opening 15 in the expansible band (Fig. 5). The means for holding the flexible brake band members against circumferential movement comprise, in addition to the abutment member 14, a number of other abutment members 16 and 17 also struck up from the material of the backing plate 5, these abutment members 14, 16, and 17 being engageable by the ends of the segmental brake band members 10 which are held by said abutment members against any substantial circumferential movement. The segmental brake band members are secured to the flexible expansible band by means of tongues 18 struck up from the metal reinforcing plates 19 of the brake band members and extending through corresponding registering openings 20 in the expansible band 9, and washers 21 through which the ends of the tongues extend, the washers being held in place on the tongues in any suitable manner as by means of pins 22 extending through the tongues 18 and engaging the washers 21.

Each segmental brake band member comprises, in addition to the sheet metal reinforcing plate 19, a flexible brake lining member 23 secured to the reinforcing plate in any suitable manner, as by rivets 24 or the like. A clearance is provided between the tongues 18 and the edges of the openings 20 in the expansible band to provide for the necessary relative movement between the expansible band and brake band members, as shown in Fig. 4.

Figure 2:
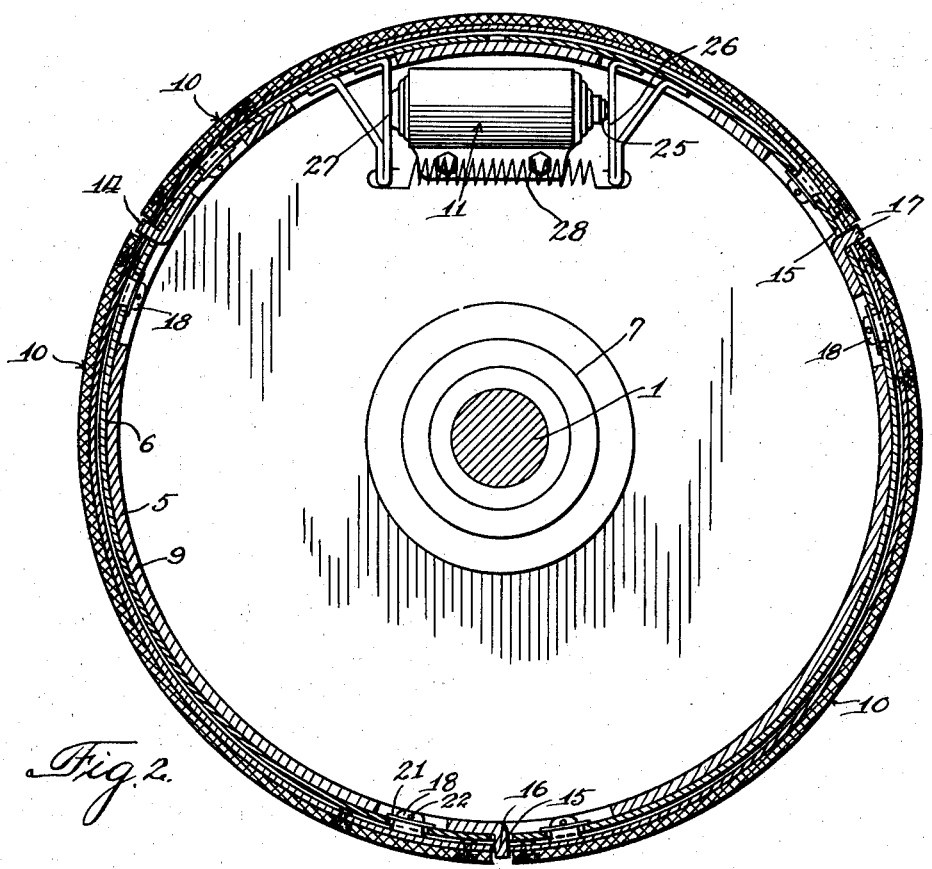
Fig. 2 is a transverse section substantially on the line 2—2 of Fig. 1.

The actuating expansible band is provided with suitable openings 15 through which the abutment members extend, all of the openings being provided with a clearance, as shown in Fig. 2, to enable the expanding action of the expansible band. For expanding the band, any suitable actuator may be provided, that shown comprising a hydraulic cylinder 11 mounted on the backing plate 5 and having a hydraulically actuated plunger 25 engaging an abutment member 26 secured to and adjacent one end of the expansible band 9. The other end of the expansible band may be provided with a suitable abutment member 27 engaging a fixed portion on the casing of the hydraulic cylinder 11. A suitable coil tension spring 28 may be provided for contracting the expansible band when the hydraulic pressure is released.

As the band 9 contracts, it will carry with it the segmental brake band members 10 which, as previously described, are secured to the expansible band. With this construction, it will be seen that as the expansible band 9 contracts, it will wrap smoothly into cylindrical shape about the cylindrical supporting surface 6 of the backing plate 5 and thus the expansible band 9 and the brake band members 10 carried thereby will be supported in coaxial relation with respect to the inner cylindrical braking surface 4 and out of contact therewith. This will cause the braking surface 4 of the segmental brake band members 10 to be uniformly spaced from the cylindrical braking surface 4 throughout their entire extent when the flexible expansible band 9 is wrapped snugly about the cylindrical surface 6 of the backing plate. It will also be seen that in use when the brakes are applied, the flexible brake band members 10 will have a self-energizing action constituting in effect three flexible, segmental, arcuate brake band members, each having substantially a one-third wrap which will give a substantial amount of self-energizing action to the brake band members.

It will be noted that I have shown no provision for take-up or adjustment between the hydraulic actuator 11 and the expansible band 9 to take care of wear on the brake mand members 10, the intention being that even when the brake band members are worn down as thin as it is advisable to allow them to wear, there will still be sufficient movement of the expansible band 9 to move the band from its position of extreme contraction, in which it closely hugs the cylindrical surface 6 of the backing plate 5 to its extremely expanded position in which the brake band members 10 are pressed snugly into engagement with the cylindrical braking surface 4.

Assuming that the brake band members will wear down sixty-thousandths (.060) of an inch and that it may be desirable to have a ten-thousandths (.010) of an inch clearance between the unworn brake band members 10 and the cylindrical braking surface 4 when the expansible band 9 is fully contracted, it will be seen that the diameter of the expansible band will have to change at least one-hundred-forty-thousandths (.140) of an inch from its fully contracted condition to its fully expanded condition, when the brake band members 10 are worn thin. This requires a substantial movement of the plunger 25 of the hydraulic actuator 11, a large portion of which movement is expended simply in moving the actuating band 9 from its fully-contracted condition to an expanded condition in which it just begins to exert braking pressure. The motion of the plunger 25 of the hydraulic actuator may thus be divided into two parts, the first part of the movement being simply to expand the expansible band 9 against the contractile forces, due to its inherent contractile condition and to the contractile effect of the tension spring 28, and the second part of the movement being that in which braking pressure is exerted to press the brake band members 10 against the cylindrical braking surface 4. The first part of this movement requires a relatively small force, whereas the second part of the movement may require a very considerable force to cause the desired braking effect.

In order to secure this relatively large movement of the hydraulic actuator, I provide hydraulic transmission between the brake pedal or brake actuator and the hydraulic cylinder 11 by means of which the first part of the movement of the pedal or brake actuator will cause a relatively large and rapid movement of the plunger 25 of the expansible band actuator and whereby the latter part of the movement of the brake pedal or brake actuator will cause a relatively short, slow and forceful action of the plunger 25 of the actuator for the expansible band. I also provide means whereby if that part of the hydraulic transmission which supplies the slow, forceful action of the band actuator fails, the other relatively rapid, low force part of the transmission may be used as an emergency apparatus to cause the application of brake pressure.

Figure 6:
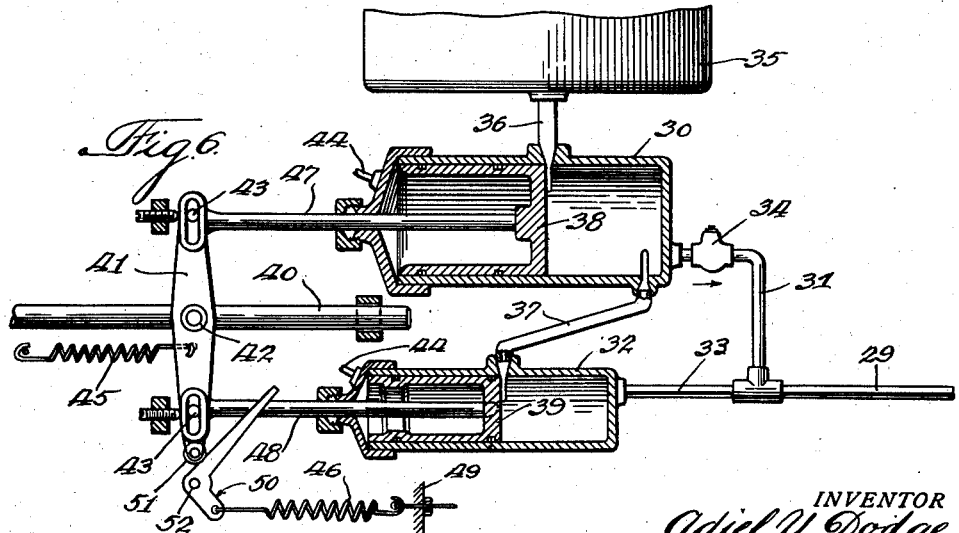
Fig. 6 is a diagrammatic view showing a hydraulic actuator for supplying fluid pressure to the brake cylinder.

The construction shown in Fig. 6 comprises a fluid conduit 29 connected with the cylinder of the expansible band actuator 11, a relatively large diameter low pressure cylinder 30 connected with this conduit by a conduit 31, a relatively small diameter, high pressure cylinder 32 connected with the conduit 29 by a conduit 33, a check valve 34 in the conduit from the low pressure cylinder to the conduit, permitting flow in the direction of the arrow from the cylinder 30 to the conduit 29 but preventing flow in the reverse direction, a fluid reservoir 35 connected with the low pressure cylinder 30 by a conduit 36, a conduit 37 connecting the low pressure cylinder 30 with the high pressure cylinder 32, a piston 38 operating in the low pressure cylinder 30, a piston 39 operating in the high pressure cylinder 32, a reciprocable plunger 40 connected with the brake pedal or brake actuator, an equalizer bar 41 pivotally connected at 42 with the reciprocable plunger 40 and having pin and slot connections 43 with the piston rods of the high and low pressure pistons, respectively, and spring means opposing resistance to the movement of the arm of the equalizer bar connected with the high pressure piston rod.

Suitable bleed connections 44 may be provided for the high and low pressure cylinders, which bleed connections may, if desired, lead to the reservoir.

In using this transmission, the first part of the movement of the reciprocable plunger 40 will cause movement of the low pressure piston 38 only, since movement of the high pressure piston is opposed by the action of the springs 45 and 46. It will be seen that the only resistance to the movement of the low pressure piston 38 is that of the fluid in the cylinder 30 acting on the relatively large exposed surface of the piston but that the forces opposing movement of the high pressure piston 39 include, in addition to the pressure of the fluid in the cylinder acting on the relatively small surface of the piston, the action of the springs 45 and 46 which also oppose movement of the piston. As the effective lever arms of the equalizer 41 acting on the piston rods 47 and 48 are substantially equal, it will be seen that as the brake-actuating slide 40 is moved, one of the pistons will be actuated which opposes the least resistance to movement. It will also be seen that so long as the low pressure cylinder is moving and causing fluid to flow through the conduit, the pressure in the two cylinders will be substantially the same, as the two cylinders are then in communication with each other through the conduits 31 and 33. Under these conditions, the force opposing motion of the large piston 38 will be the area of this piston times the unit pressure of the fluid, and the force opposing motion of the high pressure piston 39 will be the area of the small piston, times the unit area fluid pressure, plus the two spring resistances 45 and 46. It will be seen that an increase in fluid pressure will have a much greater resisting effect on the larger piston than on the smaller piston, that this differential increase in resisting effect will eventually overcome the resisting effect of the springs, and that thereafter the larger piston will cease to move and the smaller piston will begin to move gradually.

When the brake actuator slide 40 has been moved sufficiently to move the brake band members 10 into engagement with the cylindrical braking surface 4, the pressure in the conduit 29 will increase, due to the increased resistance to further expansion of the expansible band 9, and when this pressure has increased to such an extent that its opposition to movement of the large low pressure piston 38 is greater than the opposition to movement of the high pressure piston 39, caused by the pressure on the relatively small piston and the action of the springs 45 and 46, the low pressure piston 38 will gradually be brought to a standstill and the high pressure piston 39 will gradually begin to move. This will enable a relatively slow but forceful action to be exerted on the hydraulic actuator. During the movement of the high pressure piston 39, the check valve 34 will close, preventing fluid from flowing from the high pressure cylinder into the low pressure cylinder. The movement of the high pressure piston is sufficient to cause the necessary pressure to be exerted on the expansible band 9. However, if, because of wear or for any reason, the movement of the high pressure piston 39 should not be sufficient to move the brake band members 10 with sufficient pressure against the braking surface 4, further movement of the brake-actuating slide 40 will cause a further movement of the low pressure piston 38 so that by exerting an abnormal pressure on the brake-actuating slide 40, the low pressure piston 38 may be used to effect the final movement of the brake band members.

It will be noted that one of the springs 46 opposes a variable resistance to the motion of the high pressure piston 39. This is accomplished by connecting the spring at one end to a fixed support 49 and at the other end to a bell crank lever 50, one arm of which is engaged by a roller 51 on the end of the equalizer lever 41, the bell crank lever being pivotally mounted at 52. As the high pressure piston 39 moves to the right, the roller 51 on the equalizer lever will roll along the arm of the bell crank lever, thus changing the angle of the surface engaging the roller and changing the effective lever arm of that arm of the bell crank engaging the roller, thus opposing a gradually decreasing resistance to the movement of the high pressure piston 39. It will be noticed that in the shift of movement from the low pressure piston 38 to the high pressure piston 39, a point of equilibrium is reached and passed so that the low pressure piston will come to rest gradually and the high pressure piston will start to move gradually.

When it is desired to release the brake, the brake-actuating slide 40 is allowed to move to the left, as viewed in Fig. 6, under the action of a suitable spring 45. This movement of the slide will first cause the high pressure piston 39 to move to the left to enable the fluid to flow from the cylinder of the expansible band actuator 11 to the high pressure cylinder 32, the check valve 34 preventing any return flow to the low pressure cylinder 30. When the high pressure piston 39 has moved to the left to the position shown in Fig. 6, communication is established between the high pressure cylinder 32 and the low pressure cylinder 30 through the conduit 37. This enables fluid to flow from the band actuator 11 through the conduits 29 and 33 into the high pressure cylinder 32 and thence through the conduit 37 into the low pressure cylinder 30, enabling the low pressure piston 38 to return to the position shown in Fig. 6.

Further modifications will be apparent to those skilled in the art and it is desired, therefore, that the invention be limited only by the prior art and the scope of the appended claims.

Having thus described my invention, what I claim and desire to secure by Letters Patent is:

1. A brake construction comprising a rotatable brake drum having a cylindrical inner braking surface, a backing plate having a cylindrical supporting surface coaxial with said braking surface and lying within said braking surface, a flexible metal cylindrical expansible band extending around the major portion of said cylindrical supporting surface and engaging said surface when in contracted condition, a plurality of flexible segmental arcuate brake band members lying between said expansible band and said cylindrical braking surface, means for effecting relative circumferential movement between the ends of said expansible band, and means for holding said flexible brake band members against circumferential movement with respect to said cylindrical supporting surface comprising abutment means extending through said actuating band and engageable by the ends of said arcuate brake band members.

2. A brake construction comprising a rotatable brake drum having a cylindrical inner braking surface, a backing plate having a cylindrical supporting surface coaxial with said braking surface and lying within said braking surface, a flexible metal cylindrical expansible band extending around the major portion of said cylindrical supporting surface and engaging said surface when in contracted condition, a plurality of flexible segmental arcuate brake band members lying between said expansible band and said cylindrical braking surface, means for effecting relative circumferential movement between the ends of said expansible band, and means for holding said flexible brake band members against circumferential movement with respect to said cylindrical supporting surface comprising abutment means struck up from said backing plate extending through said actuating band and engageable by the ends of said arcuate brake band members.

3. A brake construction comprising a rotatable member having a cylindrical internal grip surface, a support having a continuous arcuate supporting and positioning surface adjacent said grip surface and coaxial therewith, a plurality of arcuate flexible brake straps engageable and disengageable with respect to said cylindrical grip surface, a flexible actuating band between said flexible brake straps and said continuous arcuate supporting surface, means for securing each of said flexible brake straps to said flexible actuating band at a plurality of circumferentially spaced points to prevent relative radial movement between said straps and actuating band, and means for effecting relative circumferential movement between the ends of said actuating band in one direction to force the flexible brake straps snugly against the cylindrical grip surface and in the opposite direction to force the flexible actuating band snugly against the continuous arcuate supporting and positioning surface to insure a definite clearance between the flexible brake straps and the cylindrical grip surface.

4. A brake construction comprising a rotatable member having a cylindrical internal grip surface, a support having a continuous arcuate supporting and positioning surface adjacent said grip surface and coaxial therewith, a plurality of arcuate flexible brake straps engageable and disengageable with respect to said cylindrical grip surface, a flexible actuating band between said flexible brake straps and said continuous arcuate supporting surface, means for securing each of said flexible brake straps to said flexible actuating band at a plurality of circumferentially spaced points to prevent relative radial movement between said straps and actuating band, and means for effecting relative circumferential movement between the ends of said actuating band in one direction to force the flexible brake straps snugly against the cylindrical grip surface and in the opposite direction to force the flexible actuating band snugly against the continuous arcuate supporting and positioning surface to insure a definite clearance between the flexible brake straps and the cylindrical grip surface, the securing means between the brake straps and the actuating band including lost motion means whereby a portion of the strap may have a circumferential movement with respect to the actuating band.

5. A brake construction comprising a rotatable member having a cylindrical internal grip surface, a plurality of arcuate flexible brake straps engageable and disengageable with respect to said cylindrical grip surface, a flexible actuating band bearing on said flexible brake straps, means for securing each of said flexible brake straps to said flexible actuating band at a plurality of circumferentially spaced points to prevent relative movement therebetween, and means for effecting relative circumferential movement between the ends of said actuating band to force the flexible brake straps snugly against the cylindrical grip surface, the securing means between the brake straps and the actuating band including lost motion means whereby a portion of the strap may have a circumferential movement with respect to the actuating band.

6. A brake construction comprising a rotatable member having a cylindrical internal grip surface, a support having a continuous arcuate supporting and positioning surface adjacent said grip surface and coaxial therewith, a plurality of arcuate flexible brake straps engageable and disengageable with respect to said cylindrical grip surface, a flexible actuating band between said flexible brake straps and said continuous arcuate supporting surface, means for securing each of said flexible brake straps to said flexible actuating band at a plurality of circumferentially spaced points to prevent relative radial movement between said straps and actuating band, means for effecting relative circumferential movement between the ends of said actuating band in one direction to force the flexible brake straps snugly against the cylindrical grip surface and in the opposite direction to force the flexible actuating band snugly against the continuous arcuate supporting and positioning surface to insure a definite clearance between the flexible brake straps and the cylindrical grip surface, the securing means between the brake straps and the actuating band including lost motion means whereby a portion of the strap may have a circumferential movement with respect to the actuating band, and means for holding said flexible brake band straps against circumferential movement with the rotatable member while enabling said lost motion circumferential movement.

7. A brake construction comprising a rotatable member having a cylindrical internal grip surface, a plurality of arcuate flexible brake straps engageable and disengageable with respect to said cylindrical grip surface, a flexible actuating band bearing on said flexible brake straps, means for securing each of said flexible brake straps to said flexible actuating band at a plurality of circumferentially spaced points to prevent relative movement therebetween, means for effecting relative circumferential movement between the ends of said actuating band to force the flexible brake straps snugly against the cylindrical grip surface, the securing means between the brake straps and the actuating band including lost motion means whereby a portion of the strap may have a circumferential movement with respect to the actuating band, and means for holding said flexible brake band straps against circumferential movement with the rotatable member while enabling said lost motion circumferential movement.

8. A brake construction comprising a rotatable member having a cylindrical internal grip surface, a support having a continuous arcuate supporting and positioning surface adjacent said grip surface and coaxial therewith, a plurality of arcuate flexible brake straps engageable and disengageable with respect to said cylindrical grip surface, a flexible actuating band between said flexible brake straps and said continuous arcuate supporting surface, means for securing each of said flexible brake straps to said flexible actuating band at a plurality of circumferentially spaced points to prevent relative radial movement between said straps and actuating band, means for effecting relative circumferential movement between the ends of said actuating band in one direction to force the flexible brake straps snugly against the cylindrical grip surface and in the opposite direction to force the flexible actuating band snugly against the continuous arcuate supporting and positioning surface to insure a definite clearance between the flexible brake straps and the cylindrical grip surface and means for holding said flexible brake band straps against circumferential movement with said rotatable member.

ADIEL Y. DODGE.